(12) United States Patent
Babutzka et al.

(10) Patent No.: US 6,898,794 B2
(45) Date of Patent: May 24, 2005

(54) METHOD AND SYSTEM FOR IMPROVING REMOTE FUNCTION CALLS

(75) Inventors: Dieter Babutzka, Muehlhausen-Rettigheim (DE); Markus Eichelsdoerfer, Rothenberg/Finkenbach (DE); Michael Szardenings, Gruibingen (DE)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 09/933,779

(22) Filed: Aug. 21, 2001

(65) Prior Publication Data

US 2002/0073200 A1 Jun. 13, 2002

(30) Foreign Application Priority Data

Aug. 25, 2000 (DE) ............................................ 00118461

(51) Int. Cl.⁷ ................................................ G06F 9/50
(52) U.S. Cl. ........................ 719/330; 709/226; 709/227; 709/237; 709/238
(58) Field of Search ................................. 719/310–320, 719/330; 709/200–203, 223–229, 230–245

(56) References Cited

U.S. PATENT DOCUMENTS

| | | | | |
|---|---|---|---|---|
| 6,339,783 B1 | * | 1/2002 | Horikiri | 709/203 |
| 6,381,641 B1 | * | 4/2002 | Iwasaki | 709/224 |
| 6,643,682 B1 | * | 11/2003 | Todd et al. | 709/202 |
| 6,658,490 B1 | * | 12/2003 | Williams et al. | 719/330 |
| 6,708,223 B1 | * | 3/2004 | Wang et al. | 719/315 |
| 6,728,788 B1 | * | 4/2004 | Ainsworth et al. | 719/330 |

* cited by examiner

Primary Examiner—St. John Courtenay, III
(74) Attorney, Agent, or Firm—William A. Kinnaman, Jr.

(57) ABSTRACT

The present invention relates to improvements for managing remote function calls and other mechanisms for managing the remote invocation and control of programs. A separation of the request-driven communication work from one broad unstructured bulk of work into at least two separate portions of management is proposed: a dispatching portion and one or more connection portions. Connections are not closed but are reused whenever advantageous, which yields better performance. A standardized interface is set up which is able to be used by a plurality of different requester applications. Thus, a way is found to pass a RFC connection from one application to another, and the same RFC connection can be used by totally independent applications.

20 Claims, 4 Drawing Sheets

METHOD AND SYSTEM FOR IMPROVING REMOTE FUNCTION CALLS

BACKGROUND OF THE INVENTION

1. Field of the Invention

The present invention relates to improvements in managing distributed applications. In particular, it relates to and involves improvements in managing remote function calls and other tools for managing the remote invocation and control of programs.

2. Description of the Related Art

Today, many enterprises and authorities extensively use computer program applications running on a variety of different platforms and accessing for example a common datapool from a plurality of remote locations, spread all over a country, or even all over the world. Complex integrated solutions are often accessed by end-user-associated front-end applications as well as by systems management software. Thus, a commonly found situation is that many applications, even a plurality of them within systems management software, communicate with one or more centralized application servers located more or less centrally in a respective portion of a network.

From the programmer's point of view the interconnections between applications running on remote computers are commonly implemented by so-called remote function calls (RFCs). An RFC specifies all information it needs for such a communication. Any communication which happens needs an associated connection interconnecting the respective computer systems and the respective processes. There is in each connection some overhead data which is just needed for pure traffic purposes.

For example, and with reference to FIG. 1 (prior art), in the program combination of systems management software and an integrated business application, the systems management software has several applications 10, 11, 12, 13 for the business application environment on platforms 15, 16 in the market. Some of them are standalone applications, e.g. 11, others are tools used by other applications, e.g. 10. All applications 10 to 13 establish a separate communication to an integrated business application system via RFC, but each one is designed for a special purpose: One application has to call the integrated business application every minute, another might call it only once a day. This implies a different programming logic, which has to be done by the application itself.

In particular, each systems management software application opens an RFC connection to an integrated business application system. Every connection 17, 18, 19, 20 is always closed after the RFC call is done, except connections which are held active every time, by system logging tools for example, for traffic monitoring purposes. It should be added that the systems management software applications can physically run all on one machine or on separate machines.

The systems management software application(s) are referred to herein as requestor applications because they often aim to request some, for example confirmatory, systems management data. It should be further noted that the business application may run on a plurality of different remote systems. It is thus referred to as a remote system application.

An example of commercially available systems management software is the program product Tivoli manufactured by Lotus Corp.; an example of an integrated business application is the program product R/3 by SAP AG.

The approach briefly sketched out above is found repeatedly in many other situations such that the following disadvantages have a quite general nature. They are not restricted to a specific product combination.

First, a library explicitly dedicated to inter-application management, and in particular for RFC, is provided by each integrated business application program. There may be, however, multiple versions of the program's RFC library on one machine. This can cause run time problems at least on usual personal computer platforms, like for example a Windows NT platform. This is because an RFC library is shipped together with all products which open RFC connections. Therefore there are multiple RFC libraries on one machine which has multiple systems management software (or other applications) installed. In some cases different versions of an RFC library are installed, and they are in fact not compatible. Experience shows that unpredictable RFC errors or even traps occur. The reason is that the correct RFC library will not be loaded when one RFC library is already used by other programs.

Second, systems management software applications which have to query information from the integrated business application system in short time intervals open and close a RFC connection frequently. This is a time-consuming task, mainly because of authorization checks in the integrated business application system during a logon procedure. For example, each time a connection is opened a new authorization check is performed. The authorization check and the opening of the connection causes an enormous performance problem when RFC calls which open and close a connection are frequently called.

Third, duplicate, or in general, multiple coding has to be done for connecting to an integrated business application from within each single application connecting thereto. Especially the error handling of the RFC calls is always the same, but has to be programmed each time again.

Fourth, the administration of the connections, i.e., the management of connection handles or similar mechanisms has to be done in each application. This is much work and costs performance.

Finally, any new programmed application must always include the same coding again from scratch for opening an RFC connection, calling RFC, closing the RFC connection, and error handling for all of the above.

Thus, dependent on the relationship between the amount of use data and traffic management data this may represent a significant overhead that is an obstacle to good performance as well as efficient program development.

It is thus an objective of the present invention to provide for improvements in regard of the above mentioned problems.

SUMMARY OF THE INVENTION

This objective of the present invention is achieved by the features stated in the accompanying independent claims. Further advantageous arrangements and embodiments of the invention are set forth in the respective subclaims.

In a nutshell, the present invention introduces a concept which comprises a separation of the communication work from one broad unstructured bulk of work into at least two separate portions of management: a dispatching portion and at least one connection portion. The term 'RFC Manager' is used to encompass both portions. Thus, the RFC manager is generally concerned with handling all connections to any target application as is illustrated further with the freely chosen, exemplary integrated business application system.

According to a general aspect of the present invention connections are not closed but are reused whenever advantageous, which yields a better performance. A standardized interface is set up which is able to be used by a plurality of different requestor applications. With this approach of the present invention a way is found to pass a RFC connection from one application to another and the same RFC connection can be used by totally independent applications.

For the exemplary systems management software product line this means opening a predetermined number of RFC connections, which can be used indeed by many more applications, without the need to always open a new connection, or to open a connection once and let it remain open although it is not used.

With this approach, on the one hand the number of processes can be reduced, which is desired in view of the fact that a large number of processes like, e.g., open RFC connections, have a considerable performance impact for any target system while on the other hand the connection performance is not lost.

Further, the above-mentioned interface can be set up advantageously as an easy-to-use interface for applications which is less complicated compared to the complex prior art integrated business application interface, for example.

Further, every connection is advantageously implemented as a thread within the communication process.

This helps to optimize the overall performance of the RFC manager.

BRIEF DESCRIPTION OF THE DRAWINGS

The present invention is illustrated by way of example and is not limited by the shape of the figures of the accompanying drawings in which.

DESCRIPTION OF THE PREFERRED EMBODIMENT

Figure 1:
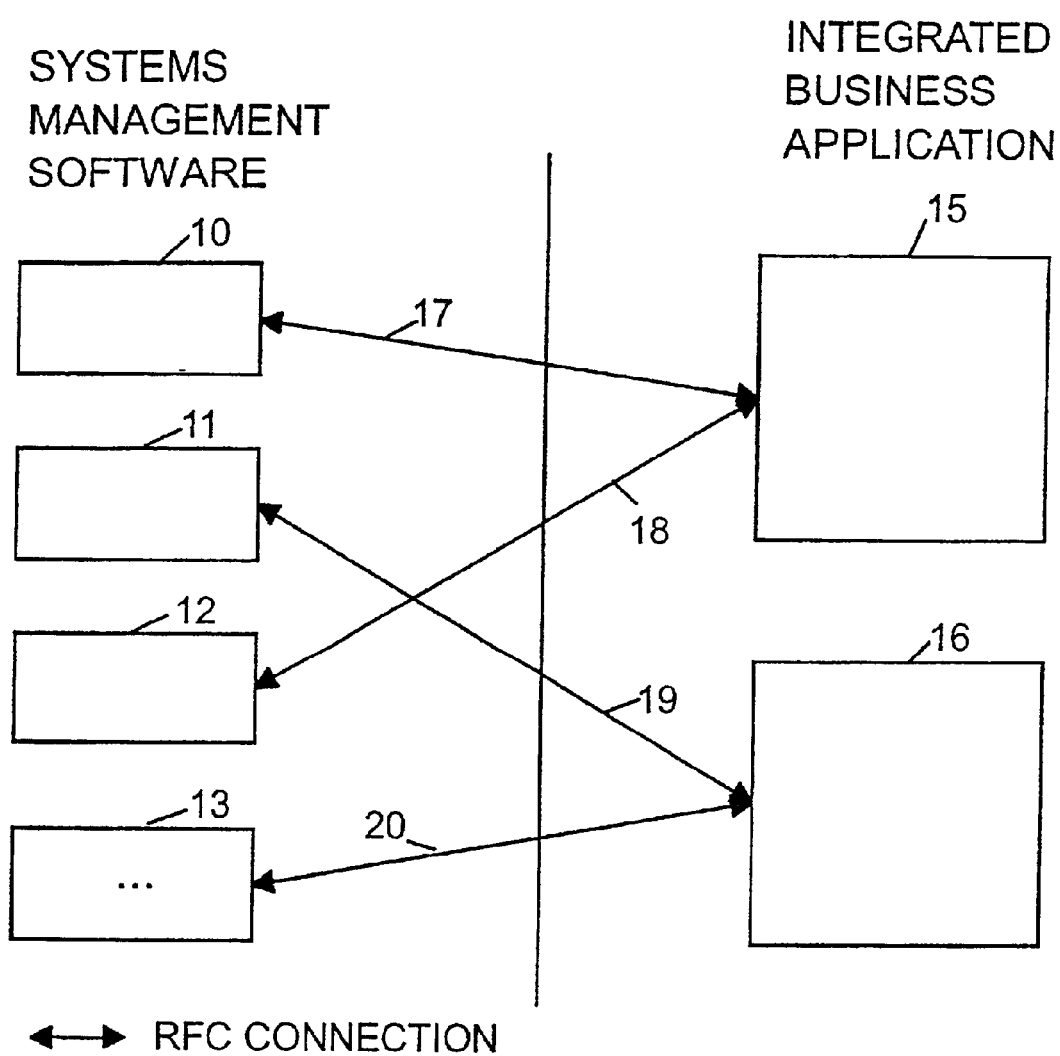
FIG. 1 is a schematic representation of the traffic organization between a systems management software (left part) and a target application (an integrated business application, right part) according to prior art.
Figure 2:
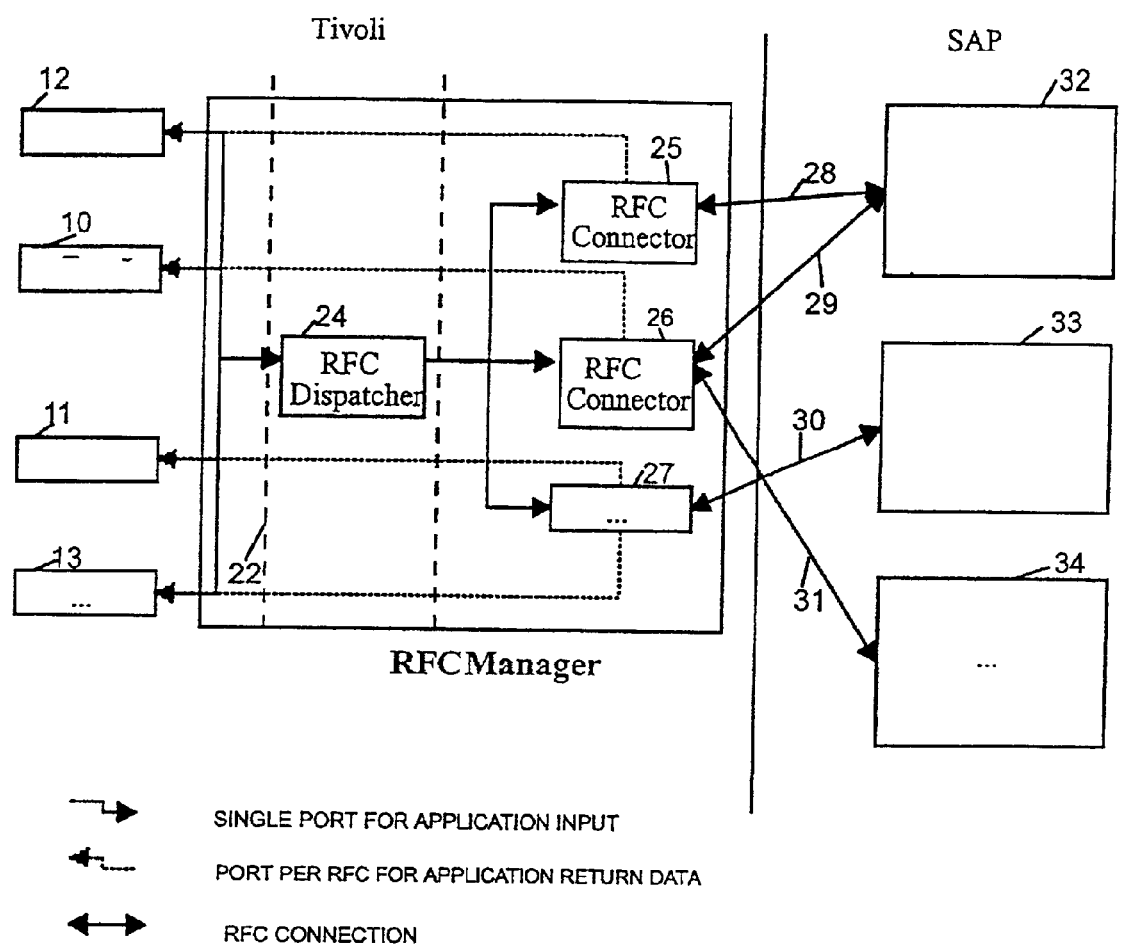
FIG. 2 is a schematic representation according to FIG. 1 showing an embodiment of the present invention in an overview.

With general reference to the figures and with special reference now to FIG. 2 a general overview of an embodiment of the RFC manager of the present invention is shown and described next, applied to a situation in which the requestor application is systems management software and the target application is an integrated business application.

Conceptually, the implementation thereof consists of at least two processes, an RFC dispatcher (RFCD) and at least one RFC connector (RFCC) which physically may run on the same machine, or on different machines, as well. In a case of the same machine shared memory can be used for exchanging information between both processes. An adequate prior art information management can be accomplished when the manager is implemented as a distributed application, distributed over more than one machine. The RFC manager itself is represented by the frame 23.

Each systems management software application 10 to 13 sends its RFC requests via socket communication in the above-mentioned one-machine case to one dedicated port 22 the RFC dispatcher 24 listens to.

Basically, the following information is sent from every systems management software application 10 to 13 to the RFC dispatcher 24: the integrated business application login data (described below), the name of the RFC module to call, and the parameters of the RFC.

The dispatcher 24 can manage, i.e., create, use, and delete a predetermined number of so-called connectors 25, 26, 27. Those connectors represent the logical envelope for physical connections 28, 29, 30, 31 to the different integrated business application systems denoted by reference signs 32, 33, 34. The vertical line represents the spatial distance between the systems management software system and the three different business application systems. Each of the connectors is implemented as a separate process.

The RFC dispatcher 24 decides which of the existing RFC connectors 25, 26, 27 currently has free working resources, and routes the request to the appropriate one. The selected RFC connector opens the connection to the integrated business application system and executes the RFC. Then it passes back the results over a predetermined port. This is done initially for the first request. Assuming there is a permanent connection (see the description below), the RFC dispatcher 24 remembers the RFC connector process which is responsible for this connection. Then it routes the new request to this process again. If necessary a new thread is created and managed for that new connection.

It is also possible to have only one connector process. In this case the RFC manager can in general not handle that much workload as a RFC manager with several RFC connectors could, but the design of such an RFC manager is much more simple.

The RFC manager 23 is started by starting the RFC dispatcher module 24 via an operating system-specific mechanism, as e.g., a starter daemon on a Unix platform or via a dedicated service for Windows NT, for example. The RFC dispatcher 24 starts a predetermined number of RFC connector processes 25, 26, 27.

Figure 3:
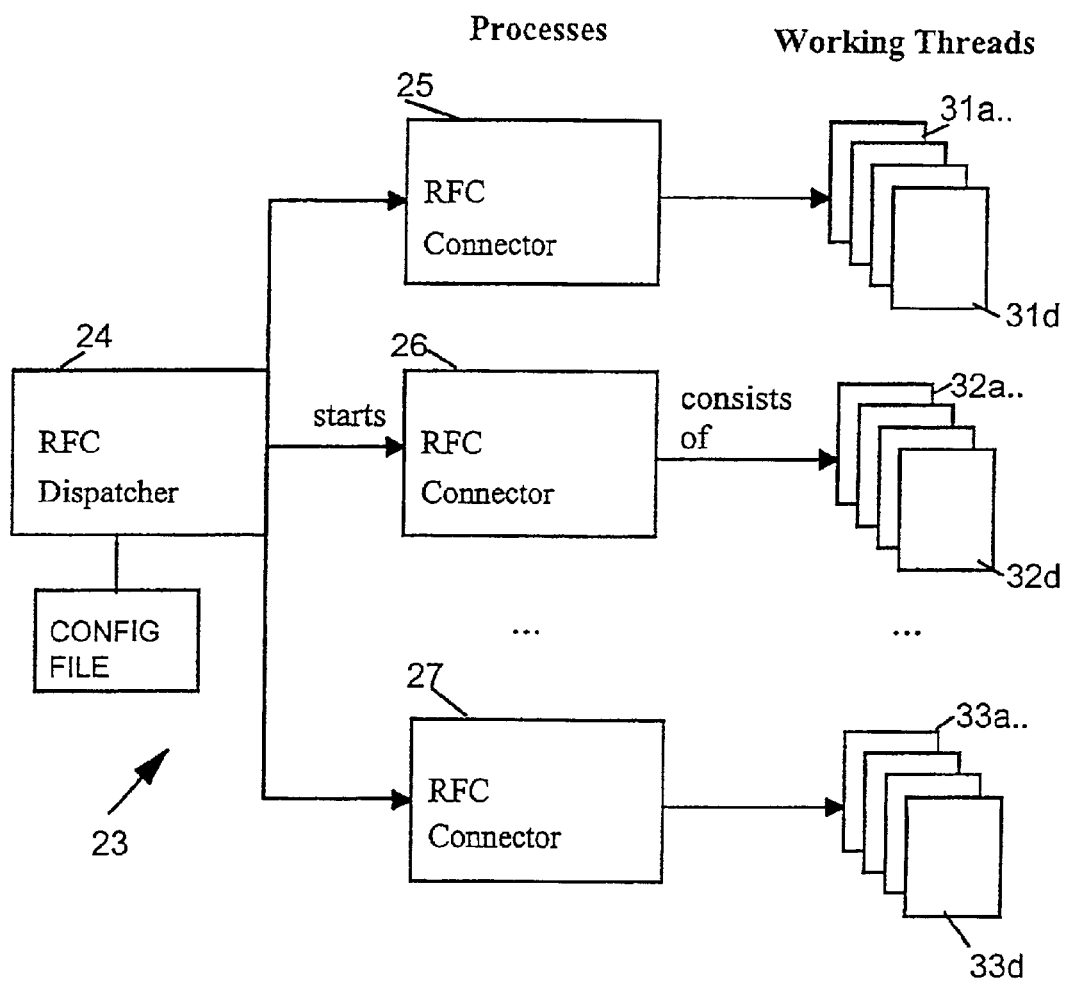
FIG. 3 is a schematic representation according to FIG. 2 showing some more details.

With additional reference now to FIG. 3 each RFC connector process 25, 26, 27 consists of several working threads 31a–31d, 32a–32d, and 33a–33d, as shown in FIG. 3. Each thread can handle one RFC connection at a time. These threads are started during initialization, as well. After initialization it is possible to start more threads on request, up to a predetermined maximum number.

The values for number of RFC connector processes, initial number of working threads per RFC connector, and maximum number of working threads per RFC connector are advantageously specified in a connection configuration file 34, which the RFC dispatcher 24 reads during startup. These values should be able to be adjusted and revisited by the dispatcher 24, depending on the dynamically varying workload of the whole system.

This approach helps to provide a better scalability of the RFC manager 23. Because the number of threads per process is limited, the RFC manager can handle more RFC connections if multiple RFCCs are available. On the other hand, if the number of connections to handle is smaller than the number of threads per process, a single RFCC is enough.

Figure 4:
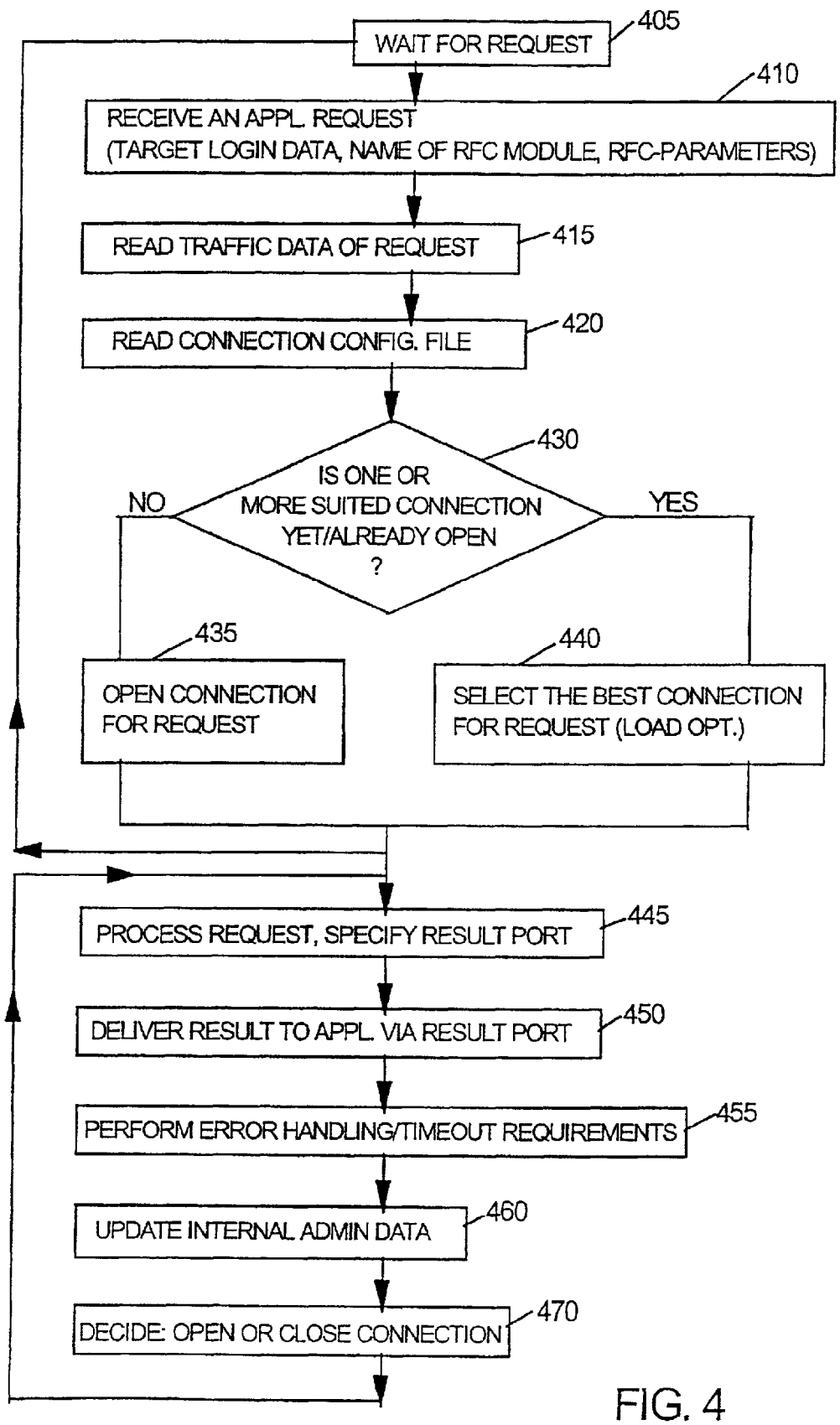
FIG. 4 is a schematic representation showing the control flow during processing according to an embodiment of the communication method of the present invention.

Next, and with additional reference to FIG. 4, some more details are given how the RFC dispatcher 24 and the RFC connectors 25, 26, 27 work together to process an application's request.

Simply stated, the RFCD waits for and listens to RFC requests on a dedicated port 22, step 405. When it receives a request, step 410, it copies the data from the port to a shared memory block and delegates the request to a free RFCC to execute. This is done with step 415, reading the traffic data of the request, i.e., in particular the target location, followed by step 420 where the connection configuration file 34 is confirmatorily checked. The delegation of the request is then done by checking, decision 430, if one or more suited connections are already open to the concerned target application. If no, a respective connection is created and used thereafter, step 435. If yes, however, the best connection is selected for the processing of the current request, step 440. Then the dispatcher 24 waits for the next request, i.e., it is branched back to step 405, while the control is delivered to the respective elected connector process for the request to be processed, step 445. Thus, concurrent processes are maintained: the dispatcher process and the plurality of connector processes.

A preferred embodiment of the present invention assures that the dispatcher 24 needs not know any connectivity details, like which RFC should be called, nor what the parameters for the RFC might look like.

To achieve this the protocol for the socket communication between the systems management software application and RFCD is proposed to look as specified below. It should be noted that this is a preferred protocol adapted to the present embodiment only. Other applications require different protocols:

According to the protocol the applications 10, 11, 12, and 13 (refer back to FIG. 2) send data packets which consist of:

Name of the RFC

Size of RFC import parameters

Size of RFC export parameters

Size of RFC table parameters

Memory block of import parameters

Memory block of export parameters

Memory block of table parameters

Integrated business application login data

Flag: permanent connection or not

The data packets are sent over the port in this form from the application by calling an application programming interface (API) as described next below:

The application API consists of a set of routines, which are delivered in a DLL. These routines replace the currently implemented calls to the RFC library. So the first disadvantage as discussed above is surmounted. It is not necessary for the application to link with the RFC library from the integrated business application anymore. Only the header files with the data types for a certain RFC call must be included.

Further, the calls SmsCallRFC, and SmsSetDefaultUser are provided:

SmsCallRFC has the following parameters:

Integrated business application logon data or 'DEFAULTUSER'

RFC Name

Pointer to import parameter

Pointer to export parameter

Pointer to table parameter

Size of import parameter

Size of export parameter

Size of table parameter

Application keyword

Timeout value

A suitable return value including error description is provided as well as what is required by the respective request.

The call 'SmsSetDefaultUser' has the parameters:

Integrated business application logon data

Application keyword and a respective return value.

Thereby the parameters and returns are described as follows:

The integrated business application logon data comprises:

SID (3-Letter System IDentifier)

Hostname

User name

Password

System ID (a number between 0 and 98 to identify the integrated business application instance)

Client

Interface keyword: The integrated business application has defined certain areas of RFC interfaces, for example a specific one for batch processing. To use an RFC call from these interfaces an additional logon is done. With this keyword the application specifies which interface it wants to log on to.

Pointers to RFC parameter: The application builds up the RFC parameters as is done according to prior art. These pointers are equal to the parameters in the RfcReceiveResp and RfcCallReceive calls.

Application keyword: To remember a connection, the RFC manager uniquely identifies the application which sends the request. Therefore an application-unique keyword is provided. The application keyword together with the integrated business application logon data uniquely identifies a connection.

Timeout value: Time after which the call returns with an error if no response from the integrated business application system is available. 0 means indefinite wait.

To provide maximum flexibility, the applications 10 to 13 can send requests to RFCD by calling SmsCallRFC with or without setting the hold-connection flag to TRUE. In the first case the RFC manager will leave the connection open for further calls of SmsCallRFC. So the performance overhead can be minimized while opening a connection and doing the authorization checks in the integrated business application system.

Setting the hold-connection flag to FALSE will cause the RFC manager to close the connection after the RFC call.

The above-described interface can replace all currently implemented RFC calls in any systems management software application. An application builds the RFC parameters as it currently does, but has not to take care about RFC itself anymore. This means an application can include only the header files for the parameters and does not have to link against the RFC library. Also all RFC error handling is done internally through the new interface. This saves a lot of duplicate coding in the application.

The second call, SmsSetDefaultUser, sets a default user for a certain application. It is stored in a user configuration file. The password can be encrypted. If the keyword 'DEFAULTUSER' is specified for the user in a SmsCallRFC call, the default user of the application is used. All other integrated business application logon parameters can be set to NULL. This offers another possibility for the application to reduce its amount of administrative work.

Next, the RFC connector implementation can be embodied as follows:

The RFC manager 23 consists of one RFCD process 23 and as many RFCC processes as specified in the connection configuration file. Each RFCC 25, 26, 27 consists of several working threads 31a–31d, 32a–32d, 33a–33d, which also can be specified in the connection configuration file. As it was already mentioned above, RFCD 23 decides which RFCC gets a certain request. The decision is advantageously made upon free resources, and/or former requests with an already open connection, respectively.

RFCD 24 passes the RFC data as target login data, name of RFC module and module parameters, to a certain RFCC, and signals it to process the request.

Then the RFCC opens or uses an already opened connection to the integrated business application system to process the request. With reference back to FIG. 4 the results of the RFC are sent back to the application over a specified port, step 450. The socket communication including error handling and timeout is handled internally within the API layer, step 455.

Then, the respective RFCC updates some internal administration data, step 460, possibly closes the connection or leaves it open, step 470, and waits for the next request, branch back to 445. There might be as many requests per process in parallel as working threads are available.

As should be revealed by the above description, the freedom of freely configuring the number of RFCC processes and working threads gives a great flexibility to adapt the RFC manager according to the required workload or the system resources available on the machine the RFC manager is running, respectively.

Due to the fact that only the RFC connector processes deal with the remote function calls themselves, only the RFCC code has to be linked with a respective RFC library. Therefore the danger of runtime errors because of incompatible RFC libraries is dramatically reduced.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

For example, the concept of the present invention can be easily inverted in terms of requestor and target application. Or, mechanisms other than remote function calls, e.g., remote procedure calls (RPCs), in general all IP client-server communications, can be applied advantageously with the concepts of the current invention.

Or it can be applied to set up a multi-user system in which repetitive calls to a stock exchange management system are processed.

The present invention can be realized in hardware, software, or a combination of hardware and software. A remote function call (RFC) manager tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods.

Computer program means or computer program in the present context mean any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A communication method in which a plurality of remote calls to at least one remote system application are issued by a plurality of requestor applications, the method comprising the steps of:
   receiving said remote calls from said requestor applications in a remote function manager;
   providing one or more connections to said at least one remote system application addressed by said calls; and
   dispatching each of said plurality of calls to a respective one of said one or more connections, said dispatching step comprising the step of passing at least one of said one or more connections from one of said requestor applications to another of said requestor applications after the connection has been used for said one of said requestor applications.

2. The method of claim 1 in which said remote calls are remote function calls.

3. The method of claim 1 in which said remote calls are remote procedure calls.

4. The method of claim 1 in which said calls specify traffic management data and use data, said method comprising the further step of:
   providing at least a memory reference for the traffic management data and use data associated with each of said calls.

5. The method of claim 1 in which said respective one of said one or more connections is a best adapted connection of said one or more connections.

6. The method of claim 1, further comprising the steps of:
   connecting via said respective one of said one or more connections to said remote application; and
   processing said call.

7. The method of claim 6 in which shared memory of a common machine is used for said steps of dispatching and connecting.

8. The method of claim 1 in which a single thread per connection is provided.

9. The method of claim 1 in which socket communication is used for communicating from said plurality of requestor applications to said remote function manager.

10. The method of claim 1 in which calls from a systems management system are processed.

11. The method of claim 1 in which calls to a stock exchange management system are processed.

12. A computer system having installed program means for performing the method of claim 1.

13. A computer program product stored on a computer usable medium comprising computer readable program means for causing a computer to perform the method of claim 1 when said program product is executed on said computer.

14. The method of claim 1 in which said dispatching step comprises the steps of:

determining whether an existing connection is free to accept a call; and dispatching the call to an existing connection if an existing connection is free to accept the call.

15. The method of claim 14 in which said dispatching step further comprises the step of:

opening a new connection and dispatching the call to the new connection if no existing connection is free to accept the call.

16. The method of claim 1 in which said dispatching step comprises the steps of:

determining whether a connection is to be reused for a new call after it has been used for a previous call; and keeping the connection open if the connection is to be reused for a new call, otherwise, closing the connection without using it for a new call.

17. In a communication system in which a plurality of remote calls to at least one remote system application are issued by a plurality of requestor applications, a remote call manager for receiving said remote calls from said requestor applications, said remote call manager comprising:

a remote call connector for providing one or more connections to said at least one remote system application addressed by said calls; and a remote call dispatcher for dispatching each of said plurality of calls to a respective one of said one or more connections, said dispatcher passing at least one of said one or more connections from one of said plurality of requestor applications to another of said requestor applications after the connection has been used for said one of said requestor applications.

18. The remote call manager of claim 17 in which said remote call dispatcher determines whether an existing connection is free to accept a call and dispatches the call to an existing connection if an existing connection is free to accept the call.

19. The remote call manager of claim 18 in which said remote call dispatcher opens a new connection and dispatches the call to the new connection if no existing connection is free to accept the call.

20. The remote call manager of claim 17 in which said remote call dispatcher determines whether a connection is to be reused for a new call after it has been used for a previous call and keeps the connection open if the connection is to be reused for a new call, otherwise, closing the connection without using it for a new call.

* * * * *